United States Patent
Casey et al.

(10) Patent No.: US 9,875,097 B2
(45) Date of Patent: Jan. 23, 2018

(54) APPLYING CONFIGURATION ALIGNMENT IN BUILD PROJECTS

(71) Applicant: Red Hat, Inc., Raleigh, NC (US)

(72) Inventors: John Dennis Casey, Raleigh, NC (US); Paul Gier, Raleigh, NC (US); Robert Nicholas Cross, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 240 days.

(21) Appl. No.: 14/631,050

(22) Filed: Feb. 25, 2015

(65) Prior Publication Data
US 2016/0246593 A1    Aug. 25, 2016

(51) Int. Cl.
*G06F 9/44* (2006.01)
*G06F 9/455* (2006.01)
*G06F 9/445* (2006.01)

(52) U.S. Cl.
CPC ............ *G06F 8/71* (2013.01); *G06F 9/45512* (2013.01); *G06F 9/44526* (2013.01)

(58) Field of Classification Search
CPC ..... G06F 8/71; G06F 9/45512; G06F 9/44526
USPC ......................................................... 717/121
See application file for complete search history.

(56) References Cited

U.S. PATENT DOCUMENTS

| | | | |
|---|---|---|---|
| 8,051,405 B2 * | 11/2011 | Komissarchik | G06F 8/71 717/106 |
| 8,745,585 B2 | 6/2014 | Watters et al. | |
| 8,813,031 B2 | 8/2014 | Agarwal | |
| 2002/0186410 A1 * | 12/2002 | Tanaka | G06F 3/1213 358/1.15 |
| 2005/0160104 A1 * | 7/2005 | Meera | G06F 8/20 |
| 2006/0271924 A1 | 11/2006 | Calcaterra et al. | |
| 2009/0171708 A1 * | 7/2009 | Bobak | G06Q 10/06 705/7.27 |
| 2009/0254912 A1 * | 10/2009 | Roundtree | G06F 8/61 718/102 |
| 2009/0320019 A1 * | 12/2009 | Ellington | G06F 8/71 717/177 |
| 2011/0231899 A1 * | 9/2011 | Pulier | G06F 9/45558 726/1 |
| 2012/0137240 A1 | 5/2012 | Krueger | |
| 2013/0024934 A1 | 1/2013 | Cushing | |
| 2013/0198717 A1 * | 8/2013 | Igelka | G06F 8/71 717/121 |
| 2013/0332901 A1 * | 12/2013 | Berg | G06F 8/71 717/121 |

(Continued)

OTHER PUBLICATIONS

Slawinska et al., Portable Build of HPC Applieaction . . . , Govt. grants, pp. 1-8.*

(Continued)

Primary Examiner — John Chavis
(74) Attorney, Agent, or Firm — Lowenstein Sandler LLP

(57) ABSTRACT

Implementations disclose applying configuration alignment in build projects is disclosed. A method of an implementation of the disclosure includes retrieving a build script (BS) file configuration from a BS file. The BS configuration includes a configuration to perform a build of a project The method also includes determining whether the BS configuration aligns with a target configuration. The method further includes aligning the BS configuration with the target configuration when it is determined that the BS configuration does not align with the target configuration.

19 Claims, 4 Drawing Sheets

(56) References Cited

U.S. PATENT DOCUMENTS

2013/0339841 A1* 12/2013 Petti .................... G06F 17/2247
715/234
2014/0074849 A1 3/2014 Zizka et al.

OTHER PUBLICATIONS

Ossher, J. et all; Bren School of Inf. & Computer Science, University of California Irvine, Ca, USA; "Automated Depedency Resolution for Open Source Software"; http://ieeexplore.ieee.org/xpl/login.jsp?tp=&arnumber=5463346&url=http%3A%2F%2Fieeexplore.ieee.org%2Fxpls%2Fabs_all.jsp%3Farnumber%3D5463346; May 2-3, 2010.

Casey, et al. "Better Builds with Maven"; ftp://188.134.25.130/programming/Java/Better%20Builds%20With%20Maven.pdf; Mar. 2008, 301 pages.

* cited by examiner

APPLYING CONFIGURATION ALIGNMENT IN BUILD PROJECTS

TECHNICAL FIELD

The implementations of the disclosure relate generally to project build management in computer systems and, more specifically, relate to applying configuration alignment in build projects.

BACKGROUND

A build script management (BSM BSM) system allows a project to be built using a set of build system components (e.g. plugins) that are shared by all projects, thus providing a uniform build system. A project refers to a directory including source code, which produces one or more software artifacts or packages. An artifact is a file produced as output of a project build. Each individual project may have configurations such as software dependencies on other projects or third-party libraries that are used during build of the project. A project may have multiple software dependencies, each of which may have its own software dependencies.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for applying configuration alignment in build projects. In one implementation, an alignment configuration component is provided on a build script management (BSM) system that functions as a preprocessor for a build project by modifying projects with a standard configuration. A project refers to a directory including source code, which produces one or more software artifacts or packages. A build project (also referred to as a "build") refers to a project that has been already built. The alignment configuration component propagates the modified projects before they are used to build. As a result, the projects are standardized to the standard configuration prior to shipping them together in a single software package.

In previous implementations of BSM systems, when attempting to build a set of projects and their configurations for the purposes of shipping them together in a single package, it is common to find that the builds use multiple versions of the same software dependency in the configurations of each of the projects. Only one version of each of the software dependencies would be selected from the projects to build the package. However, this selected version may not be aligned or be the same as an updated or current version to be utilized for the build of the package.

Implementations of the disclosure improve a BSM system by aligning the configurations used by the projects. Additionally, since the specific build tools (plugins) are configured in a wide variety of ways, implementations of the disclosure improve the BSM system by aligning the configurations to a standard for project collections in order to ensure consistent output. Specifically, the BSM system preprocesses the projects that are to be built by applying a set of modification strategies to standardize each project to a given configuration (including dependency version alignment).

Figure 1:
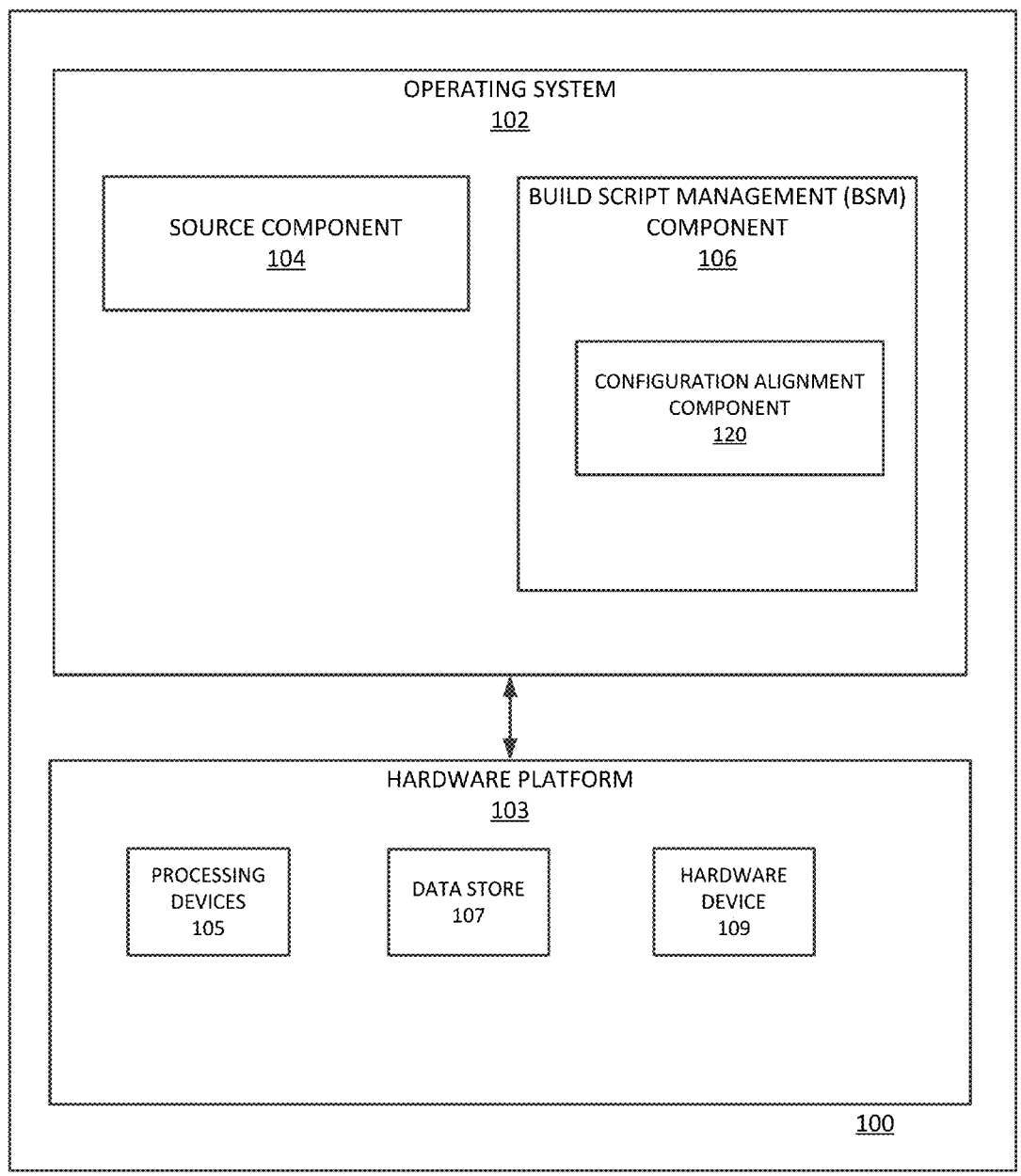
FIG. 1 illustrates a block diagram of a computer system in which the implementations of the disclosure may operate.

FIG. 1 is a block diagram illustrating one implementation of a computer system 100 for building and packaging software. In one implementation, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a mainframe server device or any other type of server device. The computer system 100 comprises a hardware platform 103, on top of which runs an operating system (OS) 102. The OS 102 may include Microsoft™, Linux™, Solaris™, Mac™ OS or any other suitable OS for managing operations on the computer system 100.

The hardware platform 103 may include one or more processing devices 105 and a data store 107. In one implementation, the data store 107 comprises one or more hardware or software devices, which may be located internally or externally to the computer system 100. Examples of data store 107 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 103 may include additional hardware devices 109, such as network interface cards (NICs), sound or video adaptors, photo/video cameras, printer devices, keyboards, displays or any other suitable device intended to be coupled to a computer system.

In one implementation, the OS 102 includes a source component 104 and a BSM component 106. The source component 104 includes source code having a build script (BS BS) file that includes configuration information to perform the build of a project. The configuration information may include, but is not limited to, a version of the artifact to be built, software dependencies on other projects, build profiles, etc. In one example, the BS file is a Maven project object model (POM) file. In one implementation, a user provides the source code. In one example, the source code is JAVA™ programming language source code.

The BSM component 106 allows a project to be built using the BS file and a set of plugins shared by all of the projects, thus providing a uniform build system. The BSM component 106 executes the plugins during the build (as configured in the BS file) of the project. The BSM component 106 retrieves and parses the BS file to extract configuration (a.k.a. BS configuration) in order to perform the build. In one implementation, the BS configuration in each BS file is particular to the project to be built relating to the software package. In one implementation, the BS configuration includes, but is not limited to, a set of plugins with corresponding versions and configuration options of the artifact to be built, a set of software dependencies along with corresponding versions on other projects, other configurations such as version of the artifact, source code locations, test code locations etc.

In one implementation, the BSM component 106 includes a configuration alignment component 120, which acts as a preprocessor for the project build using the BS files. In one implementation, the configuration alignment component 120 checks the BS configuration in each of the BS files to determine whether they align with a target configuration provided in the BSM component 106. In one implementation, the target configuration is a standard configuration used to standardize the project prior to build of the project. The target configuration may include, but is not limited to, a set of plugins with corresponding standardized versions and configuration options, a set of dependencies with corresponding standardized versions and other configuration to enable or disable other BS standardization logic that will modify the BSs. In one implementation, the target configuration is stored in one or more BS files (a.k.a. target configuration BS files) for the plugins and the dependencies, along with command-line properties consisting key/value pairs for the other configuration to enable or disable other BS standardization logic that may modify the BS configuration, which are managed by the configuration alignment component 120. In one implementation, a user provides the target configuration.

In one implementation, the configuration alignment component 120 compares the target configuration with the BS configuration in each of the BS files to determine whether each of the BS files align with the target configuration BS file. The configuration alignment component 120 may modify the BS file when it is determined that the BS configuration does not align with the target configuration BS file. In one implementation, the configuration alignment component 120 modifies the BS configuration to align with the target configuration. In one implementation, the configuration alignment component 120 renders the modified BS configuration into the BS file. In one implementation, the BS file with the modified BS configuration may be propagated before they are used to build the projects. As a result, the BSM component 106 builds the project using the BS file with the modified BS configuration.

Figure 2:
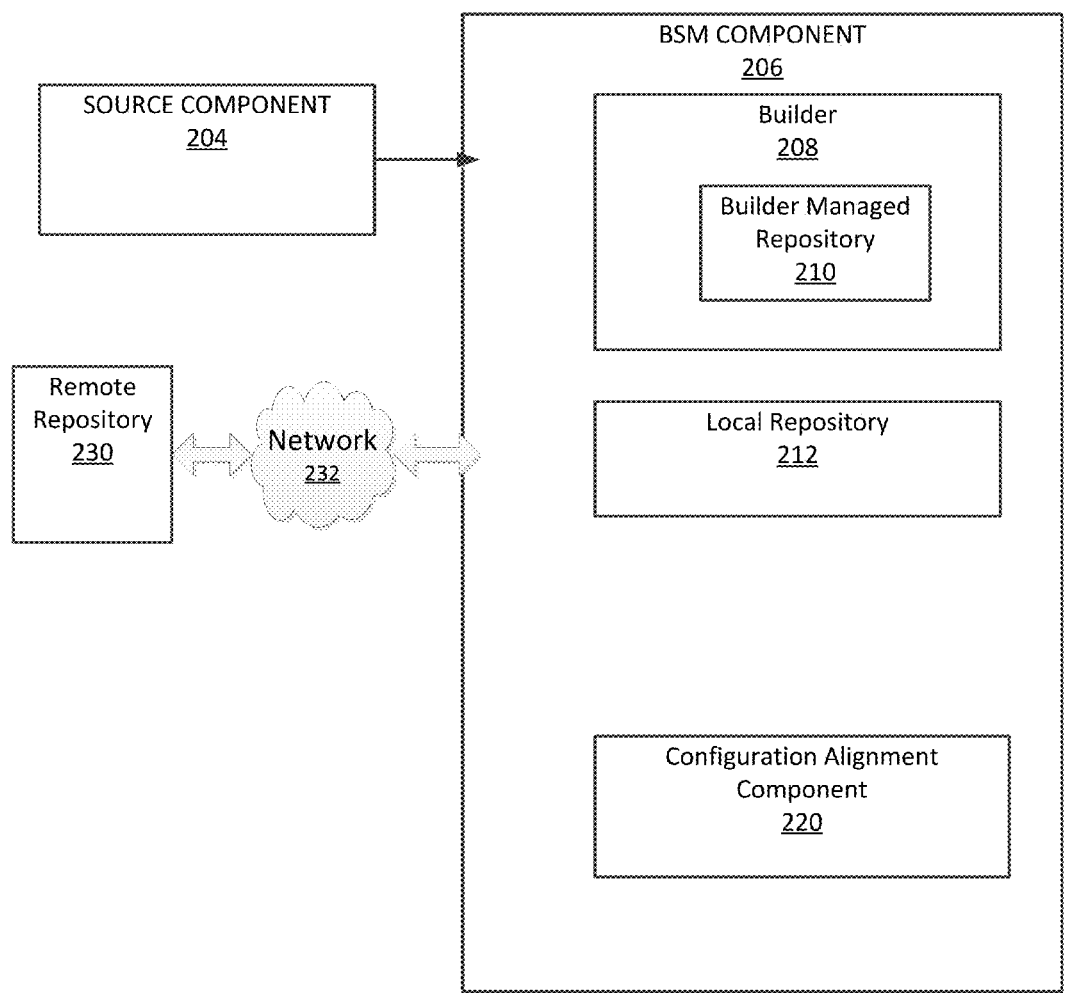
FIG. 2 illustrates a block diagram of components of a computer system in which the implementations of the disclosure may operate.

FIG. 2 is block diagram illustrating components of a computer system 200 in which the implementations of the disclosure may operate. In one implementation, computer system 200 is same as the computer system 100 of FIG. 1. In one implementation, the source component 204 is same as the source component 104 of FIG. 1, the BSM component 206 is same as the BSM component 106 of FIG. 1 and configuration alignment component 220 is same as the configuration alignment component 120 of FIG. 1.

As discussed above, the source component 204 includes source code having a build script (BS) file that includes configuration information to perform the build of a project.

The BSM component 206 includes a builder 208. In one implementation, an identifier of the BS file is supplied to the builder 208. The builder 208 parses each of the BS files to extract the configuration information (a.k.a. BS configuration) in order to perform the build and then stores the BS configuration along with a corresponding BS file in a builder managed repository 210 of the builder 208. In one implementation, the BS configuration in each BS file is particular to the project to be built relating to the software package. In one implementation, the BS configuration includes, but is not limited to, a set of plugins with corresponding versions and configuration options of the artifact to be built, a set of software dependencies along with corresponding versions on other projects, build profiles and other configurations such as version of the artifact, source code locations, test code locations etc.

In one implementation, a target configuration BS file is stored in a remote repository 230 external to the BSM component. As discussed above, the target configuration BS file stores target configuration, which is a standard configuration used to standardize the project prior to build of the project. The target configuration may include, but is not limited to, a set of plugins with corresponding standardized versions and configuration options, a set of dependencies with corresponding standardized versions and other configuration to enable or disable other BS standardization logic that may modify the BS configuration. Such other BS standardization logic are parts of the configuration alignment component 120. In one implementation, the target configuration is stored in one or more BS files (a.k.a. target configuration BS files), which are referenced by an identifier unique to the artifact. In one example, the identifier includes groupId, artifactId and version (i.e. GAV), for the plugins and the dependencies, along with command-line properties consisting key/value pairs for the other configuration to enable or disable other BS standardization logic that may modify the BS configuration. As discussed above, other BS standardization logic are parts of the configuration alignment component 120 and such are managed by the configuration alignment component 120. In one implementation, a user provides the target configuration.

In one implementation, a local repository 212 of the BSM component 206 retrieves the target configuration from the target configuration BS file stored in the remote repository 230. The local repository 212 may be a cache. The local repository 212 in the BSM component 232 communicates over a network 232 with the remote repository 230. The network 232 may be any type of communication network including, but not limited to, a local area network (LAN), a wide area network (WAN) (e.g., the Internet,) or similar communications network. The network can include any number of network devices and computing devices that are in communication over any combination of wired and wireless communication lines.

In one implementation, the configuration alignment component 220, reads each of the BS configurations. In one implementation, the configuration alignment component 220 determines whether each of the BS configurations stored in the builder managed repository 210 align with the target configuration stored in one of the local repository 112 or the remote repository 230.

In one implementation, the configuration alignment component 220 compares the target configuration with the BS configuration in each of the BS files to determine whether each of the BS configurations align with the target configurations. Specifically, configuration alignment component 220 compares the dependencies, the plugins and other configuration in the target configuration with the dependencies, the plugins and other configuration in the BS configuration of the BS file. In one implementation, the configuration alignment component 220 determines that the BS configuration does not align with the target configuration when at least one of the dependencies, the plugins and the other configuration in the BS configuration does not match with the at least one of the dependencies, the plugins and the other configuration in the target configuration. In one implementation, the configuration alignment component 220 modifies the BS configuration to match with the target configuration. Specifically, at least one of the dependencies, the plugins and other configurations in the BS configuration that does not match with at least one of the dependencies, the plugins and the other configuration in the target configuration are modified to include the at least one of the dependencies, the plugins and the other configuration in the target configuration.

In one implementation, the configuration alignment component 220 renders the modified BS configuration into the BS file. As such, any subsequent reference to the project uses aligned information from the modified BS configuration instead of the BS configuration originally in the BS file. In one implementation, the BS file with the modified BS configuration is propagated before they are used to build the projects. As a result, the builder 208 builds the project using the BS file with the modified BS configuration.

In one example, a project BS configuration specifies the following dependency:

```
<dependency>
  <groupId>junit</groupId>
  <artifactId>junit</artifactId>
  <version>4.1</version>
  <scope>test</scope>
</dependency>
```

Similarly, for example, a target configuration specifies the following dependency:

```
<dependency>
  <groupId>junit</groupId>
  <artifactId>junit</artifactId>
  <version>4.12</version>
  <scope>test</scope>
</dependency>
```

Figure 3:
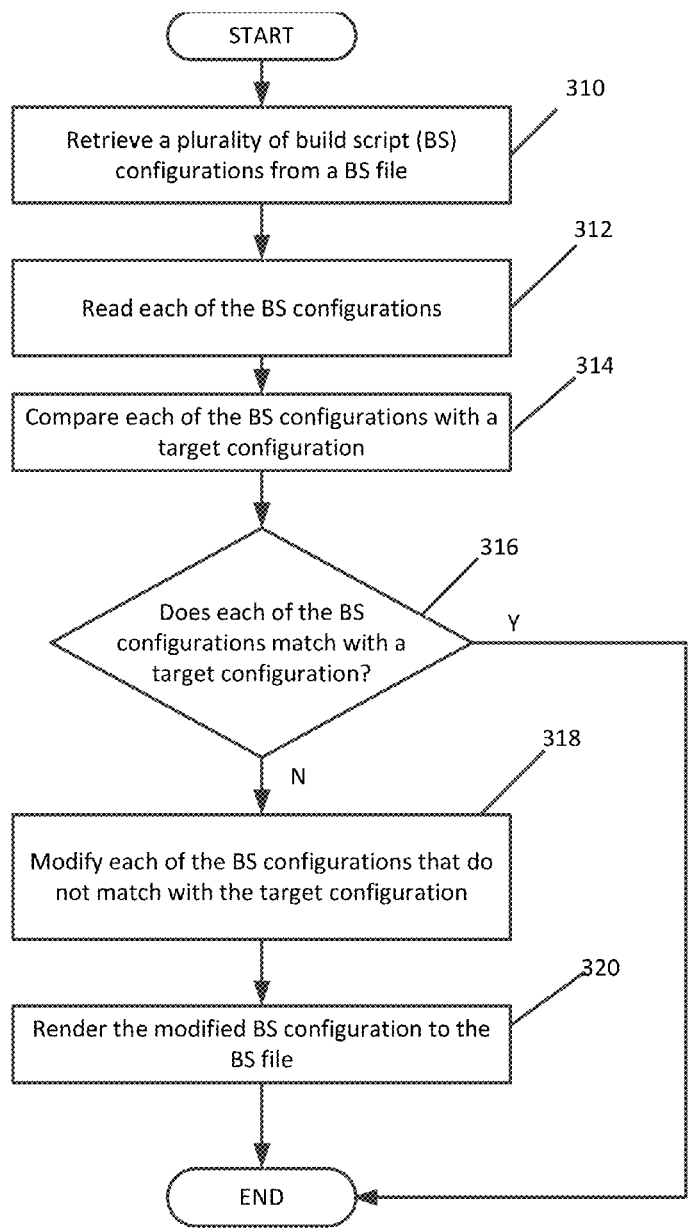
FIG. 3 illustrates a method for applying configuration alignment in build projects according to one implementation of the disclosure.

In the example, above, the "junit" dependency of the BS configuration would be altered to match that of the "junit" dependency of the target configuration. Specifically, in the example, a version 4.1 in the BS configuration would be replaced with a version 4.12 in the target configuration. This altered or modified BS configuration would be rendered into the BS configuration by replacing the BS configuration with the modified BS configuration FIG. 3 illustrates a method 300 for aligning configuration information in build projects according to one implementation of the disclosure. Method 300 may be performed by processing logic that may comprise hardware (e.g., circuitry, dedicated logic, programmable logic, microcode, etc.), software (such as instructions run on a processing device), or a combination thereof. In one implementation, method 300 is performed by configuration alignment component 110 of FIG. 1.

Method 300 begins at block 310 where a plurality of BS configurations from a BS file are retrieved. As discussed above, the BS file is parsed to extract the BS configuration. In one implementation, the BS configuration in each BS file is particular to the project to be built relating to the software package or artifact. An artifact is a compiled product of a project. In one implementation, the BS configuration includes, but is not limited to, a set of plugins with corresponding versions and configuration options of the artifact to be built, a set of software dependencies along with corresponding versions on other projects, build profiles and other configurations such as version of the artifact, source code locations, test code locations etc.

At block 312, each of the BS configurations are read. At block 314, each of the BS configurations are compared with a target configuration. In one implementation, the target alignment configuration is a standard configuration used to standardize the project prior to build of the project. The target configuration may include, but is not limited to, a set of plugins with corresponding standardized versions and configuration options, a set of dependencies with corresponding standardized versions and a configuration to enable or disable other BS standardization logic that may modify the BS configuration. At block 316, it is determined whether each of the BS configurations matches with a target configuration. In one implementation, the target configuration is provided by a user. When at block 316, it is determined that each of the BS configurations does match with the target configuration, the method ends.

When at block 316, it is determined that each of the BS configurations do not match with the target configuration, then at block 318 each of the BS configurations that do not match are modified to with the target configuration. At block 320, the modified BS configuration is rendered to the BS file. As such, any subsequent reference to the project uses aligned information from the modified BS configuration instead of the BS configuration originally in the BS file. In one implementation, the BS file with the modified BS configuration is propagated before they are used to build the projects.

Figure 4:
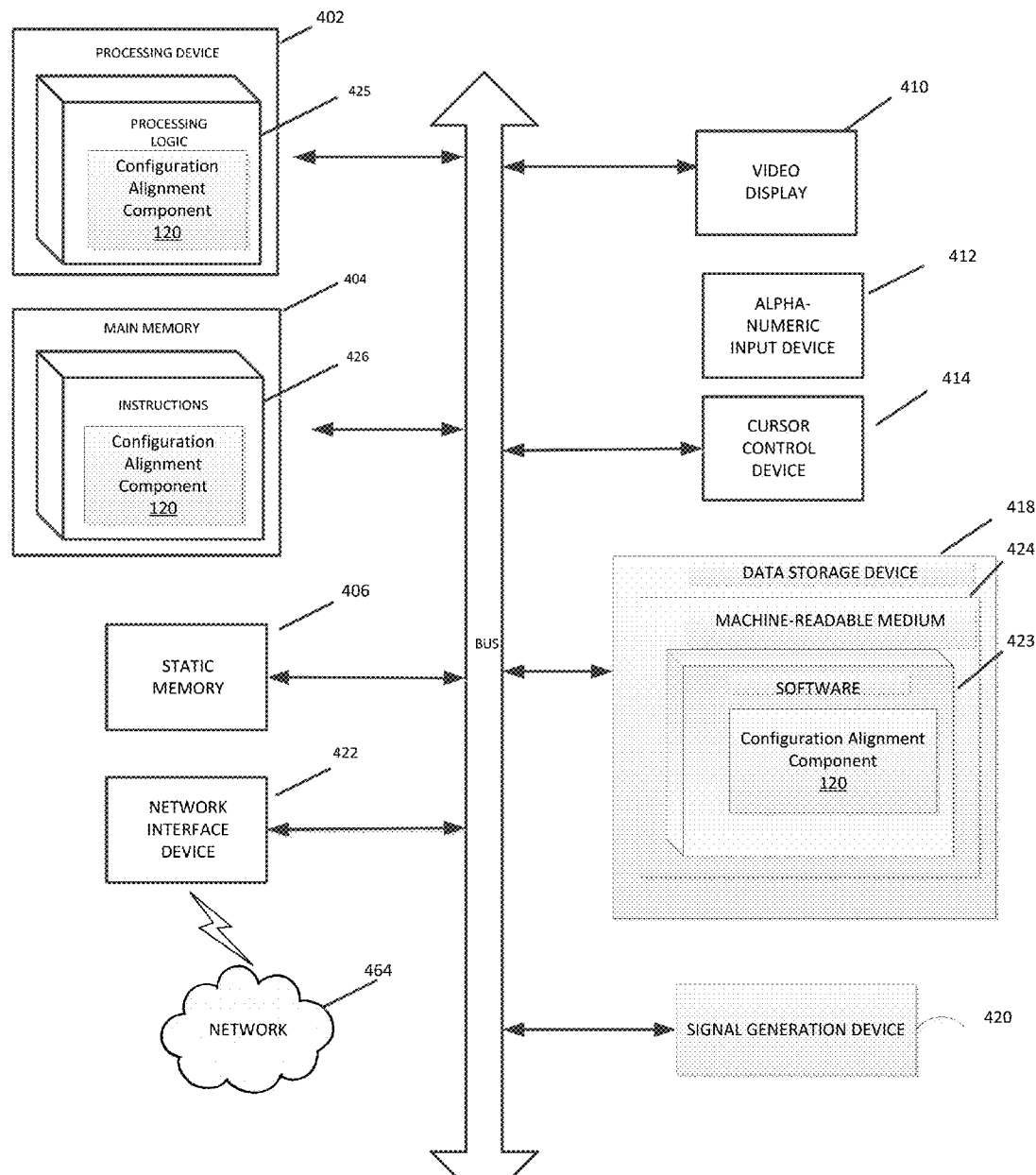
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 425 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 423 embodying any one or more of the methodologies of functions described herein. The software 423 may also reside, completely or at least partially, within the main memory 404 as instructions 426 and/or within the processing device 402 as processing logic 425 during execution thereof by the computer system 400; the main memory 404 and the processing device 402 also constituting machine accessible storage media.

The machine-readable storage medium 424 may also be used to store instructions 426 to implement a configuration alignment component 120 to implement initializing a VM on a host, such as the configuration alignment 120 described with respect to FIG. 1, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "checking", "determining", "aligning", "modifying", "updating", "providing", "deploying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
   retrieving, by a processing device, a build script (BS) configuration from a BS file, wherein the BS configuration comprises a configuration to perform a build of a project;
   determining, by the processing device, whether the BS configuration aligns with a target configuration;
   modifying, by the processing device, the BS configuration to align with the target configuration in response to determining that the BS configuration does not align with the target configuration, wherein modifying the BS configuration comprises:
modifying a dependency version of the BS configuration in view of the target configuration; and
performing the build of the project using the modified BS configuration.

2. The method of claim 1, wherein the BS configuration comprises at least one of a set of plugins with corresponding versions and configuration options of an artifact to be built, a set of software dependencies along with corresponding versions on other projects, build profiles version of the artifact, source code locations or test code locations.

3. The method of claim 1, wherein the target configuration comprises at least one of a set of plugins with corresponding standardized versions and configuration options, a set of dependencies with corresponding standardized versions and a configuration to enable or disable other BS standardization logic.

4. The method of claim 1, wherein the determining comprises comparing the BS configuration with the target configuration.

5. The method of claim 1, wherein the BS configuration is modified in response to determining that the BS configuration does not match with the target configuration.

6. The method of claim 5, further comprising rendering the modified BS configuration to the BS file.

7. The method of claim 6, wherein the modified BS configuration is rendered prior to the build of the project.

8. A system comprising:
a memory;
a processing device operatively coupled to the memory to:
retrieve a build script (BS) configuration from a BS file, wherein the BS configuration comprises a configuration to perform a build of a project;
determine whether the BS configuration aligns with a target configuration;
modify the BS configuration to align with the target configuration in response to determining that the BS configuration does not align with the target configuration, wherein to modify the BS configuration, the processing device is further to:
modify a dependency version of the BS configuration in view of the target configuration; and
perform the build of the project using the modified BS configuration.

9. The system of claim 8, wherein the BS configuration comprises at least one of a set of plugins with corresponding versions and configuration options of an artifact to be built, a set of software dependencies along with corresponding versions on other projects, build profiles version of the artifact, source code locations or test code locations.

10. The system of claim 8, wherein the target configuration comprises at least one of a set of plugins with corresponding standardized versions and configuration options, a set of dependencies with corresponding standardized versions and a configuration to enable or disable other BS standardization logic.

11. The system of claim 8, wherein to determine whether the BS configuration aligns with the target configuration, the processing device is further to compare the BS configuration with the target configuration.

12. The system of claim 11, wherein to modify the BS configuration to align with the target configuration, the processing device is further to modify the BS configuration with the target configuration in response to determining that the BS configuration does not match with the target configuration.

13. The system of claim 12, wherein the processing device is to render the modified BS configuration to the BS file prior to the build of the project.

14. A non-transitory computer-readable storage medium embodying instructions that, when executed by a processing device, will cause the processing device to:
retrieve a build script (BS) configuration from a BS file, wherein the BS configuration comprises a configuration to perform a build of a project;
determine whether the BS configuration aligns with a target configuration;
modify, by the processing device, the BS configuration to align with the target configuration in response to determining that the BS configuration does not align with the target configuration, wherein to modify the BS configuration, the processing device is further to:
modify a dependency version of the BS configuration in view of the target configuration; and
perform the build of the project using the modified BS configuration.

15. The non-transitory computer-readable storage medium of claim 14, wherein the BS configuration comprises at least one of a set of plugins with corresponding versions and configuration options of an artifact to be built, a set of software dependencies along with corresponding versions on other projects, build profiles version of the artifact, source code locations or test code locations.

16. The non-transitory computer-readable storage medium of claim 14, wherein the target configuration comprises at least one of a set of plugins with corresponding standardized versions and configuration options, a set of dependencies with corresponding standardized versions and a configuration to enable or disable other BS standardization logic.

17. The non-transitory computer-readable storage medium of claim 14, wherein to determine whether the BS configuration aligns with the target configuration, the processing device is further to compare the BS configuration with the target configuration.

18. The non-transitory computer-readable storage medium of claim 17, wherein to modify the BS configuration to align with the target configuration, the processing device is further to modify the BS configuration with the target configuration in response to determining that the BS configuration does not match with the target configuration.

19. The non-transitory computer-readable storage medium of claim 18, wherein the processing device is further to render the modified BS configuration to the BS file prior to the build of the project.

* * * * *